United States Patent
Love et al.

(10) Patent No.: US 8,417,636 B2
(45) Date of Patent: Apr. 9, 2013

(54) APPROVING ACH OPERATOR PROCESSING OF ACH PAYMENTS BASED ON AN ORIGINATING DEPOSITORY FINANCIAL INSTITUTION'S APPROVED ORIGINATOR LIST

(75) Inventors: Robert Anthony Love, Stockbridge, GA (US); Lantanya Neale Mauriello, Suwanee, GA (US); Nesta Valerie Reckord-Yarde, Lithonia, GA (US); Susan Lynne Robertson, Decatur, GA (US); Robert Williams, Decatur, GA (US); Donald E. Nelson, Marietta, GA (US)

(73) Assignee: Federal Reserve Bank of Atlanta, Atlanta, GA (US)

( * ) Notice: Subject to any disclaimer, the term of this patent is extended or adjusted under 35 U.S.C. 154(b) by 499 days.

(21) Appl. No.: 11/416,946

(22) Filed: May 3, 2006

(65) Prior Publication Data

US 2006/0206427 A1    Sep. 14, 2006

Related U.S. Application Data

(63) Continuation-in-part of application No. 10/953,754, filed on Sep. 29, 2004.

(60) Provisional application No. 60/507,294, filed on Sep. 30, 2003.

(51) Int. Cl.
*G06Q 40/00* (2012.01)
*G06F 17/60* (2006.01)

(52) U.S. Cl.
USPC .................................................. 705/43

(58) Field of Classification Search .............. 705/43
See application file for complete search history.

(56) References Cited

U.S. PATENT DOCUMENTS

| 4,270,042 A | 5/1981 | Case |
| 4,727,243 A | 2/1988 | Savar |
| 4,823,264 A | 4/1989 | Deming |

(Continued)

FOREIGN PATENT DOCUMENTS

WO    WO0030053    5/2000

OTHER PUBLICATIONS

"Development of interface between FED and Eurogiro", Jan. 14, 2003.*

(Continued)

*Primary Examiner* — Garcia Ade
(74) *Attorney, Agent, or Firm* — King & Spalding

(57) ABSTRACT

Approving automated clearing house ("ACH") payments for processing by an ACH operator is based on an approved originator list identifying originators authorized by an originating depository financial institution ("ODFI") to originate ACH payments and to send those ACH payments to the ACH operator on behalf of the ODFI. The ACH operator receives an ACH payment originated by a first originator and sent to the ACH operator on behalf of the ODFI. The ACH operator determines whether the first originator is on the approved originator list and processes the ACH payment if the first originator is on the approved originator list. The ACH operator can reject the ACH payment if the first originator is not on the approved originator list or can seek approval from the ODFI to process the ACH payment even if the first originator is not on the approved originator list.

32 Claims, 6 Drawing Sheets

U.S. PATENT DOCUMENTS

| | | | |
|---|---|---|---|
| 5,121,945 | A | 6/1992 | Thomson et al. |
| 5,175,682 | A | 12/1992 | Higashiyama et al. |
| 5,448,043 | A | 9/1995 | Nakano et al. |
| 5,532,464 | A | 7/1996 | Josephson et al. |
| 5,691,524 | A | 11/1997 | Josephson |
| 5,717,868 | A | 2/1998 | James |
| 5,742,819 | A | 4/1998 | Caccavale |
| 5,761,510 | A | 6/1998 | Smith, Jr. et al. |
| 5,783,808 | A | 7/1998 | Josephson |
| 5,787,402 | A | 7/1998 | Potter et al. |
| 5,790,778 | A | 8/1998 | Bush et al. |
| 5,794,234 | A | 8/1998 | Church et al. |
| 5,825,003 | A | 10/1998 | Jennings et al. |
| 5,848,400 | A | 12/1998 | Chang |
| 5,852,812 | A | 12/1998 | Reeder |
| 5,903,878 | A * | 5/1999 | Talati et al. ............... 705/26.41 |
| 5,940,813 | A | 8/1999 | Hutchings |
| 5,946,669 | A | 8/1999 | Polk |
| 5,956,700 | A | 9/1999 | Landry |
| 5,963,647 | A | 10/1999 | Downing et al. |
| 5,963,648 | A | 10/1999 | Rosen |
| 5,978,485 | A | 11/1999 | Rosen |
| 6,016,484 | A * | 1/2000 | Williams et al. ............... 705/39 |
| 6,026,379 | A | 2/2000 | Haller et al. |
| 6,032,133 | A | 2/2000 | Hilt et al. |
| 6,061,665 | A | 5/2000 | Bahreman |
| 6,076,064 | A | 6/2000 | Rose, Jr. |
| 6,076,074 | A | 6/2000 | Cotton et al. |
| 6,098,053 | A | 8/2000 | Slater |
| 6,119,107 | A | 9/2000 | Polk |
| 6,141,651 | A | 10/2000 | Riley et al. |
| 6,173,272 | B1 | 1/2001 | Thomas et al. |
| 6,205,433 | B1 | 3/2001 | Boesch et al. |
| 6,216,115 | B1 | 4/2001 | Barrameda et al. |
| 6,243,689 | B1 | 6/2001 | Norton |
| 6,246,999 | B1 | 6/2001 | Riley et al. |
| 6,269,345 | B1 | 7/2001 | Riboud |
| 6,304,860 | B1 | 10/2001 | Martin, Jr. et al. |
| 6,317,745 | B1 | 11/2001 | Thomas et al. |
| 6,408,284 | B1 | 6/2002 | Hilt et al. |
| 6,598,028 | B1 | 7/2003 | Sullivan et al. |
| 6,615,258 | B1 | 9/2003 | Barry et al. |
| 6,629,081 | B1 | 9/2003 | Cornelius et al. |
| 6,721,715 | B2 | 4/2004 | Nemzow |
| 6,754,640 | B2 | 6/2004 | Bozeman |
| 6,829,590 | B1 | 12/2004 | Greener et al. |
| 6,856,970 | B1 | 2/2005 | Campbell et al. |
| 6,868,408 | B1 | 3/2005 | Rosen |
| 6,873,972 | B1 | 3/2005 | Marcial et al. |
| 6,892,184 | B1 | 5/2005 | Komen |
| 7,269,575 | B1 | 9/2007 | Concannon et al. |
| 7,330,835 | B2 | 2/2008 | Deggendorf |
| 7,333,953 | B1 | 2/2008 | Banaugh et al. |
| 2001/0034682 | A1 | 10/2001 | Knight et al. |
| 2001/0034702 | A1* | 10/2001 | Mockett et al. ............... 705/39 |
| 2002/0016769 | A1 | 2/2002 | Barbara et al. |
| 2002/0029194 | A1 | 3/2002 | Lewis et al. |
| 2002/0032642 | A1 | 3/2002 | Chichilnisky |
| 2002/0035561 | A1 | 3/2002 | Archer et al. |
| 2002/0038305 | A1 | 3/2002 | Bahl et al. |
| 2002/0055904 | A1 | 5/2002 | Mon |
| 2002/0072942 | A1 | 6/2002 | Kuykendall et al. |
| 2002/0077971 | A1 | 6/2002 | Allred |
| 2002/0082962 | A1 | 6/2002 | Farris et al. |
| 2002/0087455 | A1 | 7/2002 | Tsagarakis et al. |
| 2002/0099656 | A1 | 7/2002 | Poh Wong |
| 2002/0120537 | A1 | 8/2002 | Morea et al. |
| 2002/0120846 | A1 | 8/2002 | Stewart et al. ............... 713/168 |
| 2002/0161692 | A1 | 10/2002 | Loh et al. |
| 2002/0161707 | A1 | 10/2002 | Cole et al. |
| 2002/0185529 | A1 | 12/2002 | Cooper et al. |
| 2003/0018554 | A1 | 1/2003 | Lyftogt et al. ............... 705/35 |
| 2003/0024979 | A1 | 2/2003 | Hansen et al. |
| 2003/0033228 | A1 | 2/2003 | Bosworth-Davies et al. |
| 2003/0050892 | A1 | 3/2003 | Clynes et al. |
| 2003/0055756 | A1 | 3/2003 | Allan |
| 2003/0065594 | A1 | 4/2003 | Murphy |
| 2003/0065941 | A1 | 4/2003 | Ballard et al. |
| 2003/0070080 | A1 | 4/2003 | Rosen |
| 2003/0105710 | A1 | 6/2003 | Barbara et al. |
| 2003/0126094 | A1 | 7/2003 | Fisher et al. |
| 2003/0144942 | A1 | 7/2003 | Sobek |
| 2003/0158811 | A1* | 8/2003 | Sanders et al. ............... 705/39 |
| 2003/0167223 | A1 | 9/2003 | Pledereder et al. |
| 2003/0167237 | A1 | 9/2003 | Degen et al. |
| 2003/0177087 | A1 | 9/2003 | Lawrence |
| 2003/0182227 | A1 | 9/2003 | Guzman |
| 2003/0187783 | A1 | 10/2003 | Arthus et al. |
| 2003/0187792 | A1 | 10/2003 | Hansen et al. |
| 2003/0208439 | A1 | 11/2003 | Rast |
| 2003/0208440 | A1 | 11/2003 | Harada et al. |
| 2003/0208445 | A1 | 11/2003 | Compiano ............... 705/40 |
| 2003/0220878 | A1 | 11/2003 | Degen et al. |
| 2003/0229586 | A1 | 12/2003 | Repak ............... 705/39 |
| 2003/0233319 | A1 | 12/2003 | Lawrence |
| 2004/0002914 | A1 | 1/2004 | Munro |
| 2004/0006533 | A1 | 1/2004 | Lawrence |
| 2004/0024709 | A1 | 2/2004 | Yu et al. |
| 2004/0030621 | A1 | 2/2004 | Cobb |
| 2004/0034594 | A1* | 2/2004 | Thomas et al. ............... 705/39 |
| 2004/0078328 | A1* | 4/2004 | Talbert et al. ............... 705/40 |
| 2004/0078332 | A1* | 4/2004 | Ferguson et al. ............... 705/41 |
| 2004/0083167 | A1* | 4/2004 | Kight et al. ............... 705/40 |
| 2004/0093305 | A1 | 5/2004 | Knight et al. |
| 2004/0109596 | A1 | 6/2004 | Doran |
| 2004/0117299 | A1 | 6/2004 | Algiene et al. |
| 2004/0128240 | A1 | 7/2004 | Yusin |
| 2004/0138973 | A1 | 7/2004 | Keis et al. |
| 2004/0143621 | A1 | 7/2004 | Fredrickson et al. |
| 2004/0148225 | A1 | 7/2004 | Beck et al. |
| 2004/0153403 | A1 | 8/2004 | Sadre |
| 2004/0199463 | A1 | 10/2004 | Deggendorf ............... 705/39 |
| 2004/0205011 | A1 | 10/2004 | Northington et al. |
| 2004/0236646 | A1 | 11/2004 | Wu et al. |
| 2005/0004872 | A1 | 1/2005 | Gavin et al. |
| 2005/0021454 | A1 | 1/2005 | Karpovich et al. |
| 2005/0038743 | A1* | 2/2005 | Stanley et al. ............... 705/40 |
| 2005/0044043 | A1 | 2/2005 | Gooding et al. ............... 705/42 |
| 2005/0086136 | A1 | 4/2005 | Love et al. ............... 705/30 |
| 2005/0167481 | A1 | 8/2005 | Hansen et al. |
| 2005/0177464 | A1 | 8/2005 | Komen et al. |
| 2005/0209961 | A1 | 9/2005 | Michelsen et al. |

OTHER PUBLICATIONS

Fedline User Guide, ACH, Version 2.4, Mar. 2002, including Fedline User Guide, Host Communications, Version 2.4, Jun. 1997.

ACH Goes Across the Border, South Florida Banking Institute, Vicki Anderson, Retail Payments Office, Federal Reserve System, Oct. 29, 2001.

William B. Nelson, ACH News From Europe, Payments Journal, Jan./Feb. 2002.

International ACH—Expanding the Gateway Concept Beyond Canada, Vicki Anderson, Retail Payments Office, Federal Reserve System, Apr. 15, 2002.

International Direct Deposit Technical Walkthru, Prepared for IRPPO, Oct. 9, 2002.

FedACH[SM] Product Development Discussion, Federal Reserve Financial Services, U.S. Bank, Nov. 30, 2001.

International Direct Deposit Overview, Electronic Payments, EROC, Federal Reserve Bank of New York, Oct. 9, 2002.

Overview of the Federal Reserve System's Check to ACH Conversion (CTAC) Product, Presented Feb. 15, 2002.

Overview, Federal Reserve and Check to ACH Conversion (CTAC), Presented to SWACHA—The Electronic Payments Resource, Jul. 31, 2002.

The Federal Reserve & Check-to-ACH Conversion, NACHA Electronic Check Conference, Sep. 23-24, 2002, Terry Roth, Retail Payments Office of the Federal Reserve System.

2002 ACH Rules, A Complete Guide to Rules & Regulations Governing the ACH Network, National Automated Clearing House Association, Copyright 2002. Attached pages: 1) Understanding the ACH Network: An ACH Primer, pp. 1-17; 2) Operating Rules of the National Automated Clearing House Association, Article Eight, pp. 28-29; 3) Operating Guidelines of the National Automated Clearing House Association: Section II, Chapter III, pp. 40-45; and Section IV, Chapter VI, pp. 120-140; and 4) Federal Reserve Bank Uniform Operating Circular [No. 4] on Automated Clearing House Items, Jun. 25, 2001.

PC AIMS User's Guide, Credit Controls, pp. 10-1 to 10-8, Feb. 25, 2002.

EPN Voice Response System (RALPH), Applicants submit that this document was published prior to Sep. 30, 2003.

NACHA Rule Amendment for Third-Party Service Providers: A Case Study, Chris Daniel, Partner, Alston & Bird LLP.

The Impact of NACHA Rule Changes on Third Party Service Providers, Dec. 15, 2004, Deborah Shaw, Senior Director of Network Services, NACHA.

NACHA Third Party ACH Rules: Improving Risk Management for Financial Institutions, Dec. 15, 2004, Mary O'Toole, Vice President, Bank of America.

U.S. Appl. No. 60/416,663, filed Oct. 7, 2002, Yusin.

Homsgaard, Uwe, "Eurogiro, Development of Interface Between FED and Eurogiro", Request for Proposal, Jan. 14, 2003, Eurogiro Network A/S.

* cited by examiner

| Threshold/Amounts: | | | $100,000,000.00 | $150,000,000.00 | | | | | | | |
|---|---|---|---|---|---|---|---|---|---|---|---|
| File/Time Pend | File ID | Total Debits | Total Credits | Debit Accumulator | Credit Accumulator | FedACH Agent | FedACH Agent Ent. | LOBB Verified | Released (mark w/ ".") | Rejected (mark w/ ".") | Action Email Time Sent | FedACH Accepted | FedACH Rejected | OFAC Content |
| 7:00 | A | $ 50,000,000.00 | $ 20,000,000.00 | $ 50,000,000.00 | $ 20,000,000.00 | John J. | 9999 | Jane J. | • | | 7:05 | • | | N/A |
| 9:30 | B | $ 55,000,000.00 | $ 35,000,000.00 | $ 105,000,000.00 | $ 55,000,000.00 | John J. | 9999 | Jane J. | x | | 9:45 | | x | John Doe |
| 11:20 | C | $ 20,000,000.00 | $ 20,000,000.00 | $ 125,000,000.00 | $ 75,000,000.00 | John J. | 9999 | Jane J. | • | | 11:42 | • | | N/A |
| 14:15 | D | $ 45,000,000.00 | $ 28,000,000.00 | $ 170,000,000.00 | $ 103,000,000.00 | Jane J. | 8888 | John J. | • | | 14:35 | • | | N/A |
| 20:15 | E | $ 4,000,000.00 | $ 3,000,000.00 | $ 174,000,000.00 | $ 106,000,000.00 | Mike F. | 2222 | Sue P. | | x | 20:41 | | x | Jane Doe |
| Total Amount Received: | | | $174,000,000.00 | $106,000,000.00 | | | | | | | |
| Total Amount Released: | | | $119,000,000.00 | $ 77,000,000.00 | | | | | | | |
| FedACH Processed Total: | | | $169,000,000.00 | $ 51,000,000.00 | | | | | | | |
| Remaining Balance Available: | | | $1,000,000.00 | $1,000,000.00 | | | File Totals Have Been Breached | | | | |

Figure 5

APPROVING ACH OPERATOR PROCESSING OF ACH PAYMENTS BASED ON AN ORIGINATING DEPOSITORY FINANCIAL INSTITUTION'S APPROVED ORIGINATOR LIST

RELATED PATENT APPLICATIONS

This application is a continuation in part of, and claims priority to, U.S. patent application Ser. No. 10/953,754 filed Sep. 29, 2004 and entitled "Value Tracking and Reporting of Automated Clearing House Transactions," which claims priority to U.S. Provisional Patent Application No. 60/507,294 filed Sep. 30, 2003 and entitled "System and Method for Electronic Image Quality Analysis." The subject matter of each of the above-identified priority applications is hereby fully incorporated herein by reference.

FIELD OF THE INVENTION

The present invention relates to processing automated clearing house ("ACH") financial transactions. Particularly, the present invention relates to determining whether an originating depository financial institution ("ODFI") has approved ACH payments originated by an account holder of the ODFI and sent to the ACH operator on behalf of the ODFI.

BACKGROUND OF THE INVENTION

One form of electronic funds transfer ("EFT") currently used domestically is known as direct payment (or direct deposit) instruments. A direct payment instrument is an electronically transmitted instruction to credit or debit a particular account. For example, a company can use direct payment to credit the accounts of its employees, customers, vendors, and beneficiaries. Direct payment instruments are becoming increasingly popular as conventional payment methods, such as checks, decrease in popularity. Because the transaction is performed electronically, direct payment instruments offer convenience and reliability. The electronic system that supports direct payment instruments in the United States is referred to as the Automated Clearing House ("ACH"). The ACH is a payments network that uses a batch processing, store-and-forward method for transfer of payment information. The payment information in an ACH transaction or item is an instruction to debit or credit a receiver's account. Receivers may be corporate entities or consumers. For example, a company can use an ACH payment to credit the accounts of its employees, customers, vendors, and beneficiaries. Use of the ACH network has grown significantly in the past few years as more corporations and consumers choose electronic alternatives for their transactions. The ACH provides a consistent and reliable payment alternative.

The ACH is a nationwide system supported by depository financial institutions and ACH operators, including the Federal Reserve Banks. The ACH network is governed by a set of rules administered by the National Automated Clearing House Association ("NACHA"). The ACH network provides clearing of generally small value, recurring, and one-time payments among banks that participate in the ACH network. Financial institutions collect transactions and package them in batched ACH files according to the NACHA rules for forwarding to other institutions via the ACH network.

ACH offers financial institutions, companies, consumers, and others an efficient, alternative to paper based payment methods. Throughout this specification, any reference to the term "company" is intended to be representative of the originator or receiver of electronic ACH payments and does not imply exclusion of other types of organizations or individuals. Transaction items are created by an originator and are delivered in batches to an originating depository financial institution ("ODFI"). The ODFI will transmit these batches in an ACH file to the ACH operator through its sending point. The ODFI may act as its own sending point, or it may contract with a third party or "remote" sending point, to electronically transmit the information in a file to an ACH operator. This third party or "remote" sending point may be a depository financial institution or a company providing processing services for depository financial institutions. The ACH operator can comprise the Federal Reserve Banks or another operator.

The file comprises batches, and each batch comprises one or more ACH transaction items pertaining to one originator and payment type. ACH transaction items are individual electronic debit payments or credit payments formatted to meet NACHA standards. Once received by the ACH operator, the transaction items are sorted, batched, and assembled in a file for delivery to a receiving depository financial institution ("RDFI"). The RDFI may act as its own receiving point, or it may contract with a third party, to electronically receive a file from the ACH operator. This third party may be a depository financial institution or a company providing processing services for depository financial institutions. The ACH operator may provide ACH accounting information in a machine-readable format to facilitate the automation of accounting information for participating DFIs.

The following provides definitions of the ACH system participants:

(1) ACH Operator: The Federal Reserve Banks or another operator which receives transaction items from an ODFI through its sending point, distributes the items to appropriate RDFIs or their third party receiving point(s), and can perform the settlement functions (crediting and debiting of accounts) for the affected financial institutions. In some cases, ACH operators may not perform the settlement function.

(2) Originator: A person or organization that agrees to initiate ACH entries into the payments system according to an arrangement with a receiver. The originator is usually a company that originates an ACH item to a consumer's account or another company's account. The originator is responsible for obtaining and retaining any required authorization from the receiver.

(3) Originating Depository Financial Institution ("ODFI"): A financial institution that receives the payment instructions from originators and forwards the items to the ACH operator.

(4) Receiver: A person or organization that has authorized an originator to initiate an ACH entry to the receiver's account at its RDFI.

(5) Receiving Depository Financial Institution ("RDFI"): A financial institution that receives ACH transactions from the ACH operator and posts them to the accounts of its customers (receivers).

(6) Receiving Point: The point to which files from the ACH operator are delivered for the RDFI. An RDFI may designate itself or another entity as the receiving point.

(7) Sending Point: The actual point from which a file is deposited with the ACH operator for the ODFI. The ODFI may designate itself or another entity as its sending point. The ODFI may have multiple sending points.

The following provides a description of the anatomy of a representative ACH file. ACH files comprise groups of ACH items in batches that must be in a specific sequence or the ACH operator will not process the file. Each ACH file has one file header, which primarily comprises immediate origin and destination information. Fields in the file header include the local ACH operator routing number, sending point or receiving point routing number, file date, file time, record block, destination name of the ACH operator, and origin name (the sending point or receiving point name).

Each batch comprises one or more similar ACH items and contains a batch header record that identifies the originator and the purpose of the entry and a batch control record that contains a count of the preceding entries. ACH files can comprise more than one batch. Depending on who creates the batch, either the ODFI or the originator will enter the data in the batch header. Fields in the batch header comprise the ODFI routing number, company name, company entry description (which prints on the customer statement), originator identification, batch number, effective entry date, and standard entry class code.

Each ACH batch also comprises a batch control record that announces the end of a batch. The batch control record comprises totals for the batch, such as number of items (payments), total dollar amounts, and a summation (algorithm) of the RDFI identification. Each batch must have a control record before another batch can begin. Throughout this specification, reference to a batch header can comprise information from a batch control record.

Each ACH item comprises an item detail record. The number of ACH items per ACH batch can be up to 999,999. Fields in the item detail record comprise the dollar amount, the receiver's RDFI account number and name, the transaction code for the receiver's type of account, trace number, and RDFI routing number. Each item detail record must be constructed in accordance with the NACHA record layout according to the Standard Entry Class Code of the batch.

Each ACH file also comprises a file control record at the end of the last batch in the ACH file. The file control record announces the end of the file and includes a summary of all of the batch control records. Throughout this specification, reference to a file header can comprise information from a file control record.

Each file header identifies the immediate origin (sending point or ACH operator) and destination (receiving point or ACH operator). A file may comprise batches and items for one or more ODFIs. A file can comprise items for numerous RDFIs. Typically, each batch comprises only one company's items. Input batches, which are being sent to the ACH operator by the ODFI, can comprise items for multiple RDFIs. Output batches, which are coming from the ACH operator, comprise items for only one RDFI.

A remote sending point can submit ACH payments to the ACH operator using an ODFI-owned routing number ("RTN") or through a remote connection using an electronic transaction identifier ("ETI"). An ETI is analogous to an RTN but designed for use by other than depository financial institutions. The submission on behalf of an ODFI presents a risk to the ODFI because the ODFI is responsible for the payments presented on its behalf.

Two examples of a remote sending point are a third party direct depositor (alternatively, a third party processor) and a remote originator. An ODFI may authorize a third party direct depositor to process all or a portion of the depository financial institution's ACH transactions on its behalf. That third party direct depositor then originates ACH credit and debit payments directly to the ACH operator on behalf of the ODFI. However, conventional ACH operator processing systems do not allow the ODFI to monitor and control the ACH payments originated on its behalf by a third party direct depositor. Accordingly, ODFIs desire to limit those transactions and to maintain control over the third party direct depositor.

A depository financial institution also may authorize a customer, such as an account holder, to originate ACH payments directly to the ACH operator. A customer with that authorization is a remote originator. For example, a depository financial institution can authorize a customer to originate ACH payments for the customer's payroll each month. The customer originates ACH credit payments to debit the customer's account at the depository financial institution and to credit the customer's employees' accounts. The customer forwards the originated ACH payments to the ODFI, which forwards the originated payments to the ACH operator for processing and, in some cases, settlement processing. The ODFI may not review the originated payments prior to forwarding those payments to the ACH operator. Conventional ACH operator processing systems do not allow the ODFI to monitor and control the ACH payments after receipt by the ACH operator. Accordingly, the depository financial institution needs to limit and control those payments to prevent the customer from overdrawing its account.

Furthermore, an ODFI currently cannot control ACH operator processing of payments originated by a remote sending point and sent to the ACH operator on behalf of the ODFI. For example, if a remote sending point fraudulently originates ACH payments and sends those payments to the ACH operator on behalf of the ODFI, the ODFI may not receive notice of those payments until the ACH operator has processed those payments and presents those payments to the ODFI for settlement. The ODFI cannot prevent processing and presentment of those payments by the ACH operator. Alternatively, an ODFI may revoke a remote sending point's authority to originate payments and to send those payments to the ACH operator on behalf of the ODFI. As with the fraudulently originated payments, the ODFI may not receive notice of the payments until the ACH operator has processed those payments and presents those payments to the ODFI for settlement, and the ODFI cannot prevent processing and presentment of those payments by the ACH operator.

Accordingly, a need exists in the art for allowing an ODFI to control ACH operator processing and presentment of ACH payments originated by a remote sending point and sent to the ACH operator on behalf of the ODFI. Particularly, a need exists in the art for determining whether an ODFI has approved ACH payments originated by a remote sending point and sent to the ACH operator on behalf of the ODFI. A further need exists in the art for making that determination prior to processing of the ACH payments by the ACH operator, whereby the ACH operator can reject the payments if the ODFI did not approve the payments.

SUMMARY OF THE INVENTION

The present invention comprises approving automated clearing house ("ACH") payments for processing by an ACH operator, where the ACH payments are originated by an account holder of an originating depository financial institution ("ODFI") and sent to the ACH operator on behalf of the ODFI. One exemplary ACH operator is the Federal Reserve Banks operating their Automated Clearing House ("FedACH") service. The present invention can allow ODFIs to identify which account holders are authorized to originate ACH payments and to send those ACH payments to the ACH operator on behalf of the ODFI. Prior to processing the ACH payments, the ACH operator determines whether the ODFI authorized the originator of the ACH payments to send those payments to the ACH operator on behalf of the ODFI. If the ODFI authorized the originator to take that action, then the ACH operator processes the ACH payments. If the ODFI did not authorize the originator to take that action, then the ACH operator can reject the ACH payments or can contact the ODFI for approval to process the ACH payments.

One aspect of the present invention relates to a method for approving ACH payments for processing by an ACH operator based on an approved originator list. The approved originator list identifies originators authorized by an ODFI to originate ACH payments and to send those ACH payments to the ACH operator on behalf of the ODFI. The ACH operator receives an ACH payment originated by a first originator and sent to the ACH operator on behalf of the ODFI. The ACH operator determines whether the first originator is on the approved originator list and processes the ACH payment if the first originator is on the approved originator list. The ACH operator can reject the ACH payment if the first originator is not on the approved originator list or can seek approval from the ODFI to process the ACH payment even if the first originator is not on the approved originator list.

These and other aspects, objects, and features of the present invention will become apparent from the following detailed description of the exemplary embodiments, read in conjunction with, and reference to, the accompanying drawings.

BRIEF DESCRIPTION OF THE DRAWINGS

FIG. 5 illustrates a file tracking and reporting table according to an exemplary embodiment of the present invention.

DETAILED DESCRIPTION OF EXEMPLARY EMBODIMENTS

Figure 1:
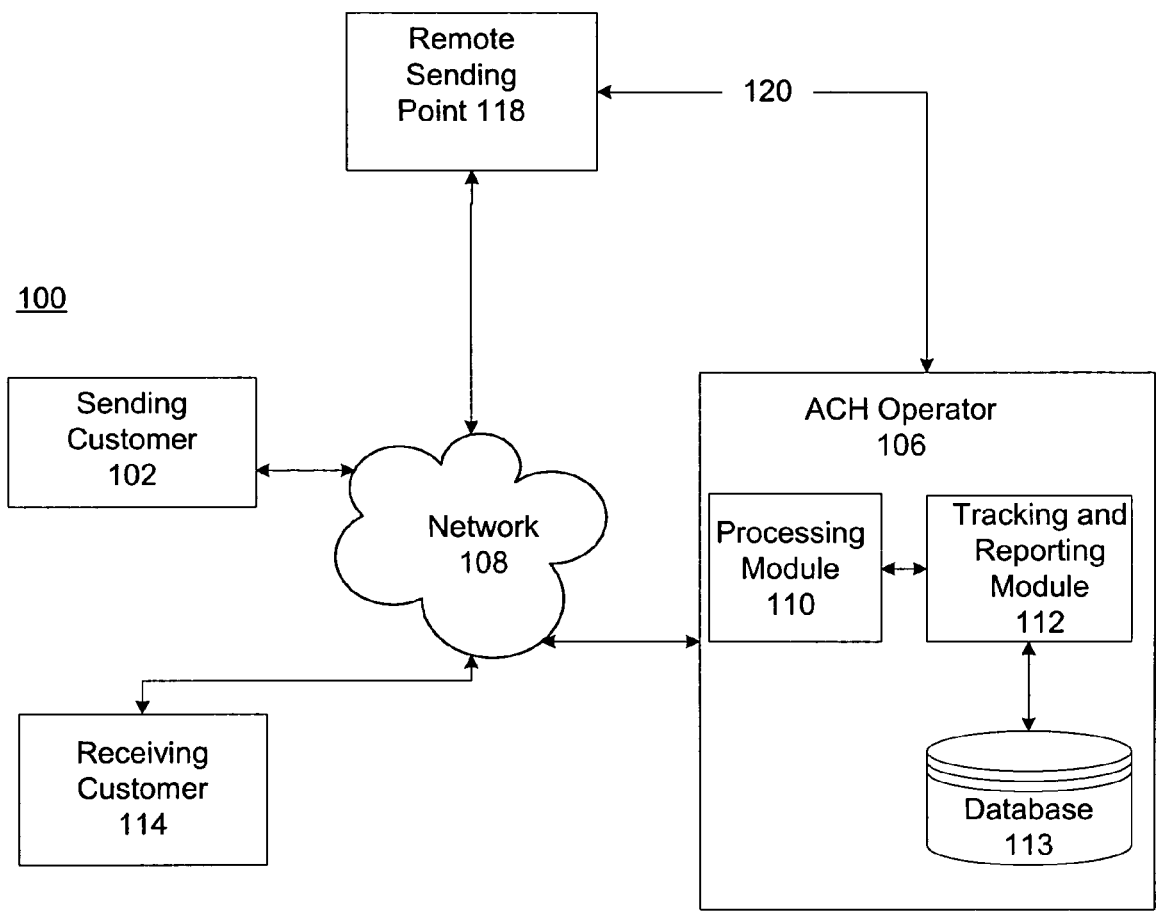
FIG. 1 is a block diagram depicting a system for value tracking of automated clearing house payments processed by an ACH operator according to an exemplary embodiment of the present invention.

The present invention can allow an originating depository financial institution ("ODFI") to pre-approve account holders that are authorized to originate automated clearing house ("ACH") payments and to send those payments to an ACH operator for ACH processing. The ODFI can create an approved originator list identifying originators with that authority and can send the approved originator list to the ACH operator. When the ACH operator receives ACH payments sent by an originator on behalf of the ODFI, the ACH operator determines whether the originator is on the approved originator list. If yes, then the ACH operator processes the ACH payments. If the ACH operator is not on the approved originator list, then the ACH operator rejects the ACH payments or contacts the ODFI for approval to process the ACH payments.

The present invention comprises a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

In an exemplary embodiment according to the present invention, a method comprises the following steps to monitor the dollar value of ACH operator volume initiated by a remote sending point on behalf of an ODFI and forwarded to an ACH operator:

1. Determine whether an incoming ACH file or batch is designated for value tracking and reporting services.

2. If not, then process the undesignated ACH payments.

3. If yes, then pend communication of the designated sending point file or batch at a preprocessing point. "Preprocessing" means prior to processing the file or batch.

4. Sum debit payment values and credit payment values, respectively, in the file or batch for a given ODFI by settlement date, process date, or exposure period.

5. Add the summed debit and credit payment values to the running debit and credit payment totals, respectively, for settlement date, process date, or exposure period to obtain an accumulated debit value and an accumulated credit value. The running debit and credit payment totals comprise a total value of prior debit and credit payments, respectively, for the ODFI previously processed during the specified time period.

6. Compare the accumulated debit and credit payment values to pre-established value payment caps (debit and/or credit) to determine the process status of a given file or batch.

7. If the accumulated debit and credit payment values for a given settlement date, process date, or exposure period do not exceed the respective debit or credit value payment cap, then release the file or batch for processing and settlement.

8. If the accumulated debit or credit payment values for a given settlement date, process date, or exposure period exceed the respective debit or credit value payment cap, then notify the ODFI that the pending payments will exceed the cap.

9. If the ODFI approves overriding the debit or credit payment cap and processing of the cap-exceeding ACH payments, then release the file or batch for processing and settlement.

10. If the ODFI does not approve overriding the payment cap to process the cap-exceeding payments, then reject the file or batch.

The above steps can monitor and approve the dollar value of ACH payments initiated by a remote sending point on behalf of an ODFI. In an exemplary embodiment, the file can comprise information identifying the remote sending point and the ODFI responsible for the ACH payments. In another exemplary embodiment, the remote sending point can transmit an ACH file comprising ACH payments for only one ODFI. In another exemplary embodiment, the remote sending point can communicate an ACH file comprising batches of ACH payments for multiple ODFIs. In that case, each batch can comprise information identifying the specific ODFI responsible for respective batches of ACH payments. Accordingly, the value tracking and reporting system can sum ACH credit and debit payments received from a specific remote sending point for a specific ODFI. Then, the system can verify the total value of ACH payments in the batch or file with respect to a credit and/or debit payment cap, as discussed above.

In another exemplary embodiment, the remote sending point can communicate all ACH payments for a specific ODFI using a unique identification number ("ID"). That process can apply at the file or batch level. The value tracking system can correlate the unique identification number to a remote sending point and a corresponding ODFI. Then, the method can determine whether the ODFI desires value tracking by verifying the ODFI's subscription to that service. Next, the value tracking and reporting system can sum ACH credit and debit payments, respectively, received from a specific remote sending point for a specific ODFI. Then, the system can verify the total value of ACH payments in the batch or file with respect to a credit and/or debit payment cap, as discussed above.

To prevent the remote sending point from circumventing the ID restriction by originating activity for the ODFI under an additional ID, the ODFI can contract with the remote sending point to use a single ID. However, the ODFI may not be able to control the ID used by the remote sending point, and the ODFI relies on the remote sending point's good will to process its volume under a single ID. Accordingly, the ODFI may not accept the risk of relying on the remote sending point's good will to use a single ID. In an exemplary embodiment, the value tracking method can require the remote sending point to initiate all ACH payments for a specific ODFI through a dedicated node and sending point routing number ("RTN"). In that case, the sending point cannot change IDs for a specific ODFI. The ACH files can be identified by the network origination location. The security protocol mechanism attached to the remote sending point's communications protocol connection can be used to allow the remote sending point to send only specific IDs via a particular circuit. The ID of the file can be validated to the remote sending point's process ID. Accordingly, the value tracking system can require the sending point to use a dedicated node and sending point RTN to transmit work on the ODFI's behalf. Then, the method can determine whether the ODFI desires value tracking by verifying the ODFI's subscription to that service. Next, the value tracking and reporting system can sum ACH credit and debit payments, respectively, received from a specific remote sending point for a specific ODFI. Then, the system can verify the total value of ACH payments in the batch or file with respect to a credit and/or debit payment cap, as discussed above.

In another exemplary embodiment, the value tracking system can sum all ACH payments for an ODFI from multiple remote sending points. In that case, the credit and debit payment caps can control the aggregate value of all ACH payments for an ODFI received from multiple sending points.

Processing of the ACH payments comprises determining whether to accept ACH payments for settlement. Processing involves examining the information in the ACH file to determine whether all required information is present and in the required format. First, a processing module of the ACH operator examines the file header information to determine if it conforms to the NACHA required format and content. If the file header information conforms to the required information, then the processing module accepts the file. In that case, the processing module performs a similar examination of each batch header in the file to determine whether to accept the respective batches. If the batch header information conforms to the required information, then the processing module accepts the respective batch. Then, the processing module examines the item detail record for each item in the accepted batches to determine whether it conforms to the required information. If yes, then the processing module accepts the respective items for settlement. In an exemplary embodiment, the processing module also can perform the settlement function to settle the accepted ACH items. Settlement involves debiting and crediting the appropriate ODFI and RDFI accounts related to each accepted ACH item.

If the file header, batch header, or item detail record do not conform to the required information, then the processing module rejects the respective file, batch, or item. In that case, the processing module will not settle the rejected files, batches, or items. Accordingly, the sending customer must correct the errors in the information and resubmit the rejected file, batch, or item in a new file for acceptance.

Referring to the drawings, in which like numerals represent like elements, additional aspects of the exemplary embodiments will be described.

FIG. 1 is a block diagram depicting a system 100 for value tracking of ACH payments processed by an ACH operator 106 according to an exemplary embodiment of the present invention.

Value tracking involves tracking the value of ACH payments over a specified time period to prevent exceeding a pre-established payment cap for the value of those payments. In a typical ACH transaction, a sending customer 102 initiates an ACH payment with a receiving customer 114 by forwarding the ACH payment to the ACH operator 106. The sending customer 102 comprises an ODFI that sends payments on behalf of an originator to the ACH operator 106 either directly or through a remote sending point. The receiving customer 114 comprises an RDFI that receives payments from the ACH operator 106 either directly or through a remote receiving point. The sending customer 102 also can authorize a remote sending point 118 to originate ACH payments on its behalf and to forward those ACH payments directly to the ACH operator 106. The remote sending point 118 communicates each ACH payment as an ACH item in an ACH file. Each ACH file comprises one or more ACH batches that each comprise one or more ACH payment items.

As shown in FIG. 1, the various parties to the transaction can communicate ACH files and other information via a secure session over a distributed computer network 108. For example, the remote sending point 118 can communicate the electronic ACH file to the ACH operator via the network 108. In exemplary embodiments, the distributed computer network 108 can comprise the Internet, a virtual private network, a computer interface protocol, or other suitable network. Alternatively, the various parties can communicate the ACH files and other information via a secure, direct communication link 120. For example, the remote sending point 118 can communicate the electronic ACH files to the ACH operator via the direct communication link 120. In an exemplary embodiment, the link 120 can comprise a direct frame relay connection.

Figure 2:
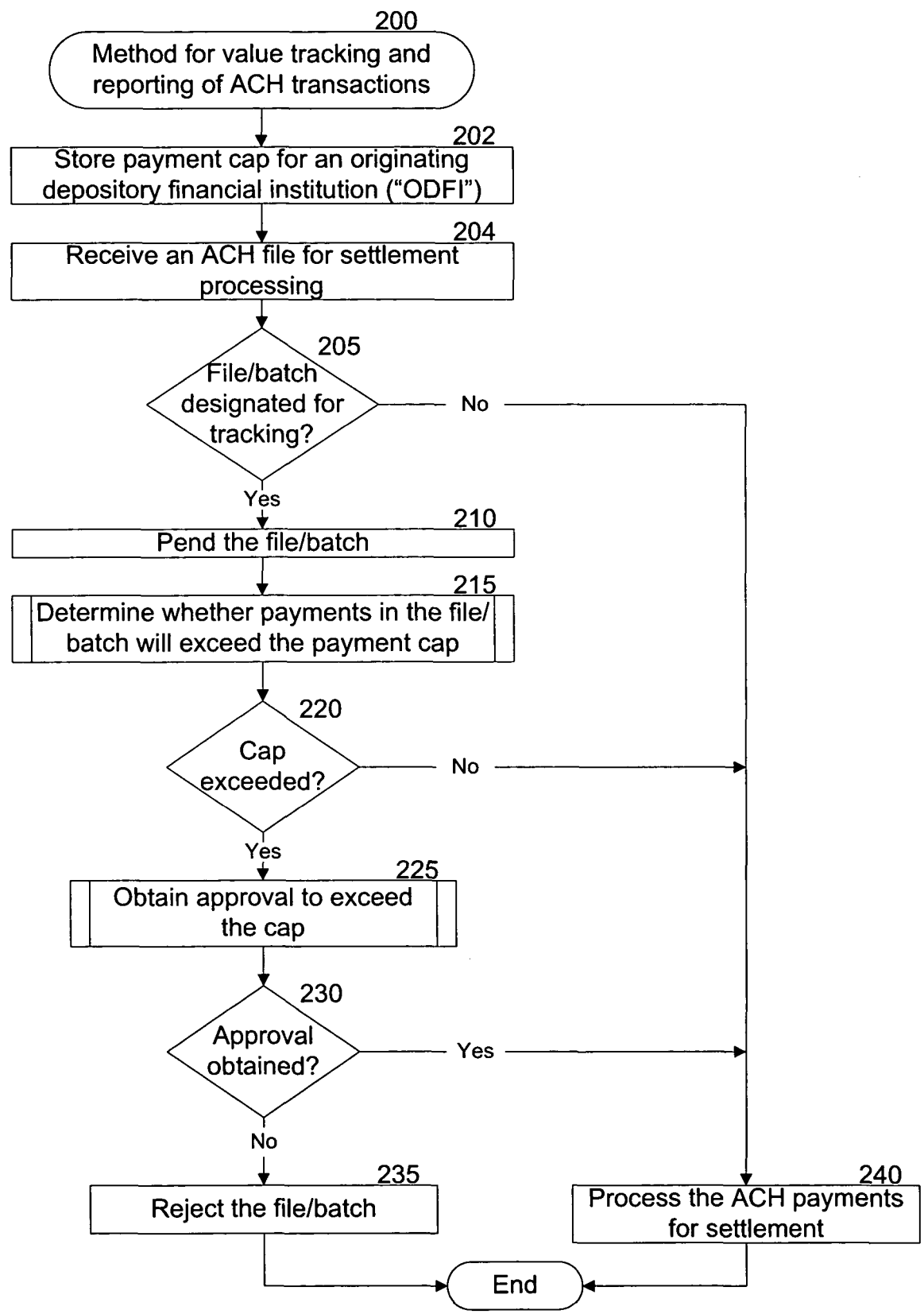
FIG. 2 is a flow chart depicting a method for value tracking and reporting of ACH transactions according to an exemplary embodiment of the present invention.

FIG. 2 is a flow chart depicting a method 200 for value tracking and reporting of ACH transactions according to an exemplary embodiment of the present invention. The method 200 will be described with reference to FIGS. 1 and 2.

In step 202, the ACH operator 106 stores credit and debit payment caps for one or more sending customers 102 in the database 113. The sending customers 102 can establish their respective credit and debit payment caps to limit credit risk associated with ACH origination.

In step 204, the processing module 110 of the ACH operator 106 receives an ACH file communicated from the remote sending point 118 processing. The ACH file comprises one or more batches, each comprising one or more ACH payment items ("payments").

In step 205, the processing module 110 determines whether the ACH file, or one or more batches within the ACH file, is designated for value tracking and reporting. The processing module 110 can make the determination of step 205 in any suitable manner. In an exemplary embodiment, the processing module 110 can search the file header or batch header for a data string that indicates the corresponding file or batch is designated for value tracking and reporting. In an alternative exemplary embodiment, the processing module 110 can identify the sending customer 102 responsible for the payments based on the name, routing number or other identification number, or other suitable information of the sending customer 102 within the ACH file or ACH batch. Then, the processing module 110 can determine whether the sending customer subscribes to the value tracking and reporting service by comparison of the sending customer 102 to a subscriber list. If the processing module 110 matches the information of the sending customer 102 with information on the subscriber list, then the processing module 110 will perform value tracking and reporting of the ACH payments of the sending customer 102.

In another exemplary embodiment, the sending customer 102 can request file tracking and reporting of ACH payments for a particular originator of the sending customer 102. For example, the sending customer 102 can provide its own identifying information combined with the identifying information of the originator to the ACH operator 106. The ACH operator 106 can store that information in the subscriber list. In exemplary embodiments, the originator information can comprise an account number, a customer/company number, or other information suitable to identify the originator. By including the combination of sending customer 102 information and originator information in the headers of ACH files or batches, the processing module 110 can identify payments for file tracking and reporting based on the particular originator of the sending customer 102.

Thus, file tracking and reporting can be performed for various entities related to a sending customer 102. In an exemplary embodiment, the method can apply to ACH payments of the sending customer 102, regardless of the entity that forwards the payments to the ACH operator 106. For example, file tracking and reporting can be performed for ACH payments forwarded to the ACH operator 106 by the particular remote sending point 118 on behalf of the sending customer 102. Alternatively, file tracking and reporting can be performed for ACH payments forwarded to the ACH operator 106 by the sending customer 102 without using the remote sending point 118. In another exemplary embodiment, the method can apply to ACH payments of a particular originator of the sending customer 102 when those payments are forwarded to the ACH operator 106 by the sending customer 102 or the remote sending point 118. In any case, the processing module 110 determines in step 205 whether the ACH payments in the file or batch are designated for file tracking and reporting.

If the processing module 110 determines in step 205 that the file or batch is not designated for value tracking and reporting, then the method branches to step 240 to process the ACH payments. The processing module 110 processes the ACH file, including the batches and payments in the file, to determine whether to accept the ACH file, the ACH batches, and each ACH payment. To determine whether to accept the ACH file, the processing module 110 examines the NACHA required information in the file header to determine if all of the required information is present and in the proper format. Another part of the validation process examines if the relationships between the parties in the transactions match the legal relationships as defined in an ACH customer directory database. If the NACHA required information is present and properly formatted and the relationships are correct, then the processing module 110 accepts the file for ACH transaction processing of the batches included therein.

The processing module 110 also processes each ACH batch in the ACH file to determine whether to accept each batch. To determine whether to accept an ACH batch, the processing module 110 examines the NACHA required information in the batch header to determine if all of the required information is present and in the proper format and to determine if the relationships between the parties in the transactions match the legal relationships as defined in the ACH customer directory database. If the NACHA required information is present and properly formatted and the relationships are correct, then the processing module 110 accepts the batch for ACH transaction processing of the payments included therein.

The processing module 110 also processes each ACH payment in each ACH batch to determine whether to accept each payment. To determine whether to accept an ACH payment, the processing module 110 examines the NACHA required information in the payment detail record to determine if all of the required information is present and in the proper format and that the relationships are correct. If the NACHA required information is present and properly formatted and the relationships are correct, then the processing module 110 accepts the payment for ACH transaction processing and settlement.

For each ACH payment, the processing module 110 records a process date on which the processing module 110 will perform the payment processing discussed above. Additionally, the processing module 110 records a settlement date for each ACH payment. The settlement date is the date on which the appropriate accounts are credited or debited to settle the ACH payment. The settlement date initially comprises the future date of settlement until the accounts are debited and credited. Then, the settlement date reflects the actual settlement date of the ACH payment.

Referring back to step 205, if the processing module 110 determines that the file or batch is designated for value tracking and reporting, then the method branches to step 210. In step 210, the processing module 110 pends the file or each individual batch designated for value tracking. In an exemplary embodiment, the processing module 110 pends the designated file or batch prior to the start of processing of the payment included therein. In an alternative exemplary embodiment, the processing module 110 can pend the designated file or batch during that processing.

In step 215, the tracking and reporting module 112 determines whether the credit and debit payments in the file or in the individual batch will exceed the respective payment cap established by the sending customer 102 responsible for those payments. Step 215 is discussed in more detail below with reference to FIG. 3.

In step 220, the tracking and reporting module 112 determines the next processing action based on whether the payments will exceed the payment cap. If the credit or debit payments within the file or batch will not cause the payment cap to be exceeded, then the method branches to step 240 to process the ACH payments. If the tracking and reporting module 112 determines in step 220 that the payments in the file or batch will cause the payment cap to be exceeded, then the method branches to step 225.

In step 225, the ACH operator 106 obtains approval to exceed the payment cap from the sending customer 102 responsible for the payments. Step 225 is discussed in more detail below with reference to FIG. 4. Then, in step 230, the method 200 determines whether the sending customer 102 approved exceeding the payment cap. If the sending customer 102 approved exceeding the payment cap, then the method branches to step 240 to process the ACH payments within the file or batch. If the method 200 determines in step 230 that the sending customer 102 did not approve exceeding the payment cap, then the method branches to step 235. In step 235, the tracking and reporting module 112 rejects the file, and the processing module 110 communicates rejection of the file to the remote sending point 118.

Figure 3:
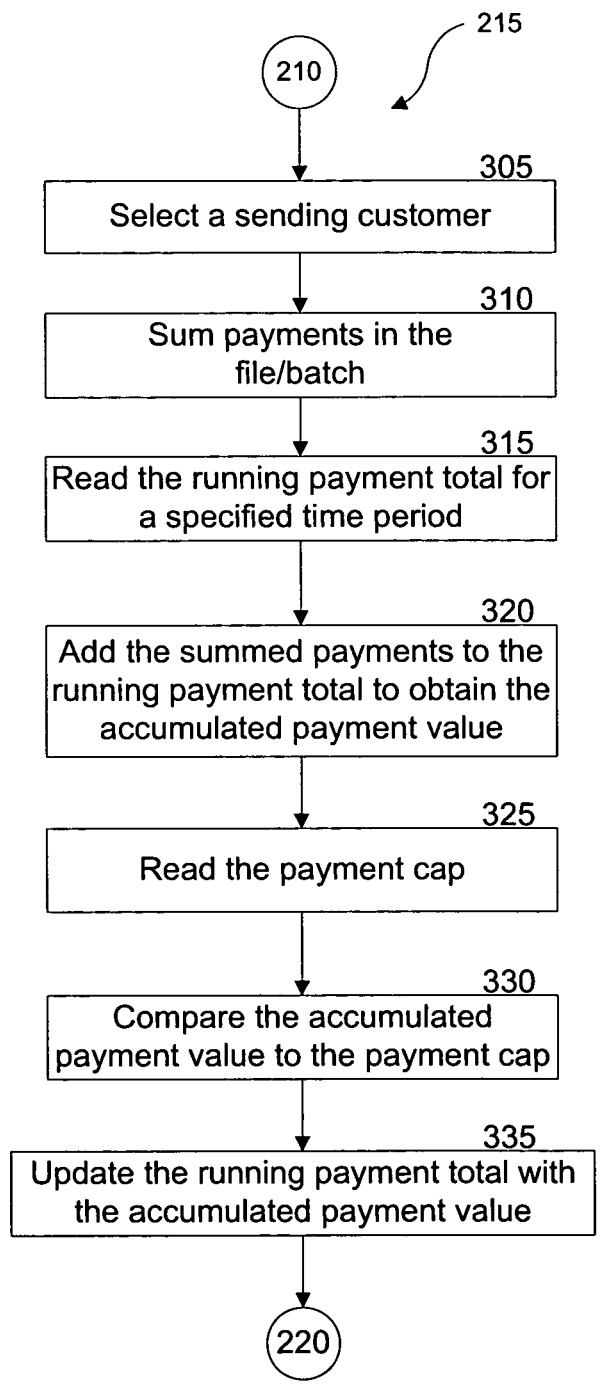
FIG. 3 is a flow chart depicting a method for determining whether payments in a file or batch will exceed a pre-established payment cap according to an exemplary embodiment of the present invention.

FIG. 3 is a flow chart depicting a method 215 for determining whether payments in a file or batch will exceed a pre-established payment cap according to an exemplary embodiment of the present invention, as referred to in step 215 of FIG. 2. The method 215 will be described with reference to FIGS. 1 and 3.

In step 305, the tracking and reporting module 112 selects a sending customer 102 responsible for credit or debit payments within the file. If the ACH file comprises batches of ACH credit or debit payments for only one sending customer 102, then the tracking and reporting module 112 can select that sending customer 102. If the ACH file comprises batches of ACH credit or debit payments for more than one sending customer 102, then the tracking and reporting module 112 selects a sending customer 102 responsible for the payments in one of the batches in the ACH file. Then, the tracking and reporting module 112 continues the method 215 for the selected sending customer 102 and can repeat the method 215 for each sending customer 102. In any event, the method 215 proceeds to step 310 for the selected sending customer 102.

In step 310, the tracking and reporting module 112 sums the credit payments in the file or batch and separately sums the debit payments in the file or batch.

In step 315, the tracking and reporting module 112 reads a running credit payment total and a running debit payment total for a specified time period from the database 113. The running credit payment total is a sum of all credit payments processed for the sending customer 102 during the specified time period. The running debit payment total is a sum of all debit payments processed for the sending customer 102 during the specified time period. In an exemplary embodiment, the running payment totals can comprise a sum of all credit or debit payments processed for the sending customer, which payments were originated by a particular remote sending point. In another exemplary embodiment, the running payment totals can comprise a sum of all credit or debit payments processed for the sending customer, which payments were originated by multiple remote sending points. In another exemplary embodiment, the running payment totals can comprise a sum of all credit or debit payments processed for the sending customer, which payments were originated by one or more remote sending points and/or the sending customer. Accordingly, the payment totals can reflect payments forwarded to the ACH operator from the sending customer, the sending customer and one or more remote sending points, a single remote sending point, or multiple remote sending points. The running payment totals are set to zero at the beginning of the specified time period. Accordingly, the running payment totals equal zero for the first set of ACH payments processed during the specified time period.

The specified time period can comprise any suitable time period for which the sending customer 102 desires to establish a credit or debit payment cap. In an exemplary embodiment, the specified time period can comprise the processing date of the ACH payments. In an alternative exemplary embodiment, the specified time period can comprise a settlement date of the ACH payments.

In another alternative exemplary embodiment, the specified time period can comprise an exposure period of the ACH payments, which is the time between the process date and the settlement date. The exposure period encompasses ACH payments that have been processed but not settled and the return risk associated with debit payments. In an exemplary embodiment, the exposure period can comprise two days for processed credit payments and three days for processed debit payments. An account holder can initiate an ACH credit payment without having sufficient funds in the account to cover the payment and later can deposit sufficient funds before the settlement date. However, the ACH operator will debit the sending customer 102 for the ACH payment on the settlement date, regardless of whether the account holder has sufficient funds in its account. An account holder can initiate an ACH debit payment, which adds funds into its account. Those funds may be returned in the event of a dispute or insufficient funds in the receiving account. Accordingly, the sending customer 102 may desire to monitor the amount of unsettled, processed payments to monitor its exposure for those payments.

In step 320, the tracking and reporting module 112 adds the summed credit payments to the running credit payment total to obtain the accumulated credit payment value. The tracking and reporting module 112 also adds the summed debit payments to the running debit payment total to obtain the accumulated debit payment value.

In step 325, the tracking and reporting module 112 reads the payment cap stored in step 202 (FIG. 2) for the sending customer 102 selected in step 305. The tracking and reporting module 112 can read a credit payment cap and/or a debit payment cap established by the sending customer 102. Then, in step 330, the tracking and reporting module 112 compares the accumulated payment value to the payment cap to determine whether the accumulated payment value exceeds the payment cap. The tracking and reporting module 112 can make that comparison and determination for either the credit payments or the debit payments.

In step 335, the tracking and reporting module 112 updates the running payment total with the accumulated value and stores the updated running payment total in the database 113. The method then proceeds to step 220 (FIG. 2).

Figure 4:
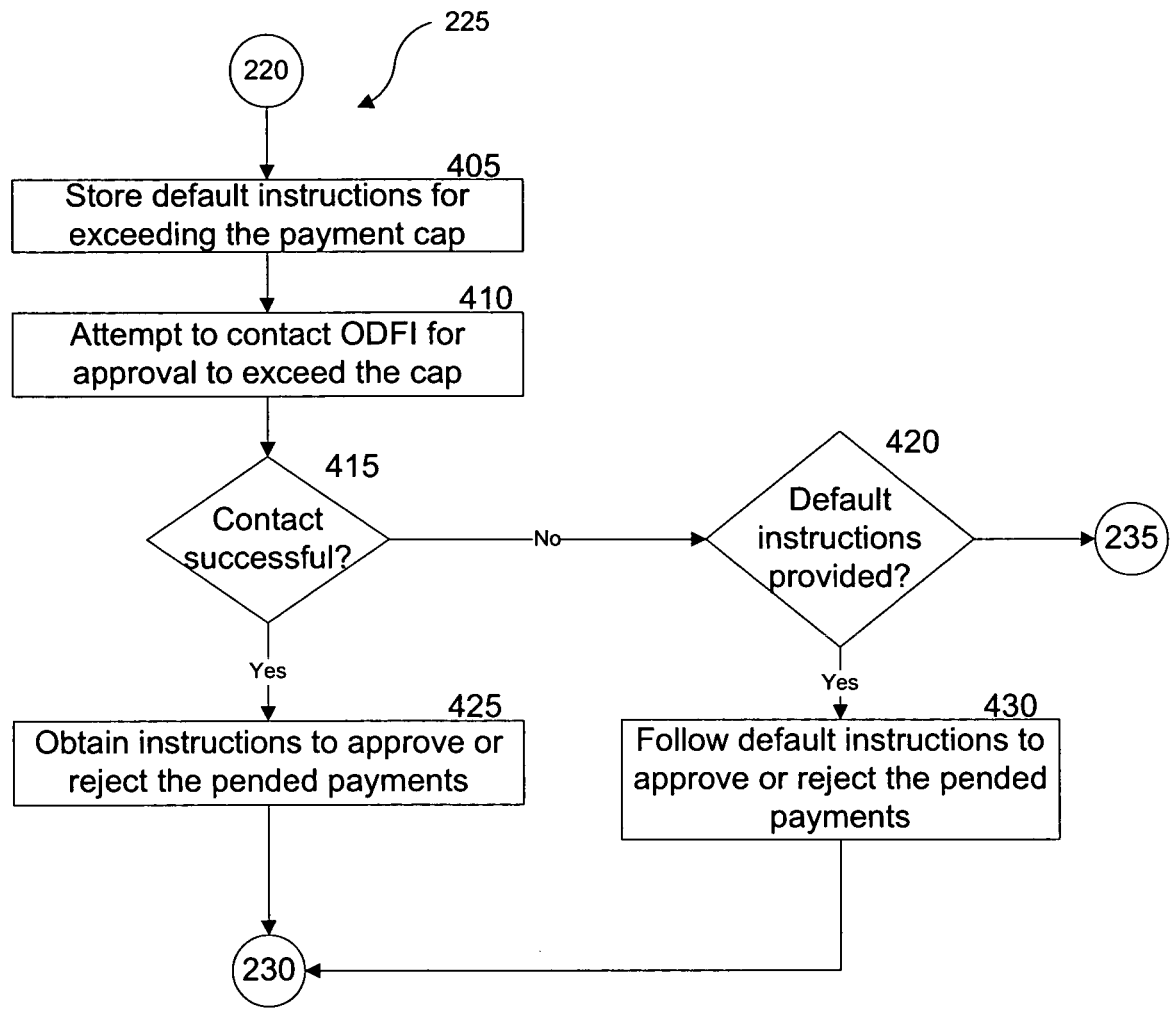
FIG. 4 is a flow chart depicting a method for obtaining ODFI approval to exceed an established payment cap according to an exemplary embodiment of the present invention.

FIG. 4 is a flow chart depicting a method 225 for obtaining sending customer approval to exceed an established payment cap according to an exemplary embodiment of the present invention, as referred to in step 225 of the FIG. 2. The method 225 will be described with reference to FIGS. 1 and 4.

In step 405, the ACH operator 106 stores a sending customer's 102 default instructions for exceeding the payment cap in the database 113. The sending customer 102 can establish default instructions to define ACH operator 106 actions in case the ACH operator 106 cannot contact the sending customer 102 for approval to exceed a payment cap.

In step 410, the ACH operator 106 attempts to contact the sending customer 102 for approval to exceed the established payment cap. The ACH operator 106 can contact the sending customer 102 via any suitable method. According to an exemplary embodiment, the tracking and reporting module 112 can generate an e-mail requesting authorization to exceed the payment cap and can forward that e-mail to the sending customer 102 via the network 108. In an alternative exemplary embodiment, the ACH operator 106 can contact the sending customer 102 via telephone or e-mail for approval to exceed the payment cap.

In step 415, the method 200 determines whether the ACH operator 106 successfully contacted the sending customer 102. If not, then the method 225 branches to step 420, discussed below. If the ACH operator 106 successfully contacted the sending customer 102, then the method branches to step 425.

In step 425, the ACH operator 106 obtains instructions from the sending customer 102 to approve exceeding the payment cap or to reject the pended payments. The sending customer 102 can provide its instructions by any suitable method. In an exemplary embodiment, the sending customer 102 can verbally instruct the ACH operator 106 via telephone or other communications device to approve exceeding the payment cap or to reject the pending payments. In an alternative exemplary embodiment, the sending customer 102 can instruct the ACH operator via e-mail to the ACH operator 106 or directly to the tracking and reporting module 112. The method 225 then proceeds to step 230 (FIG. 2).

Referring back to step 420, if the ACH operator 106 could not successfully contact the sending customer 102 in step 415, then the method determines in step 420 whether the ACH operator 106 has default instructions from the sending customer 102 stored in the database 113. If the sending customer 102 has not provided default instructions, then the method 225 branches to step 235 (FIG. 2) to reject the pended payments. If the sending customer 102 has provided default instructions, then the method branches to step 430. In step 430, the ACH operator 106 follows the default instructions to approve or reject the pended payments. The method then proceeds to step 230 (FIG. 2).

The following text describes another alternative exemplary embodiment of the present invention. In that embodiment, each file or batch of ACH payments included in the file tracking and reporting service can be identified by a header that includes an identifier. For example, the identifier can comprise a four letter ID such as "XXXX." The value tracking and reporting method can provide the file tracking and reporting service with respect to ACH payments in files or batches identified by the XXXX identifier.

The sending customer 102 can specify in writing, a daily aggregate value for all debit items (the "debit payment cap"), and/or a daily aggregate limit for all credit items (the "credit payment cap"), that may be originated using the XXXX identifier during a specified time period. Thereafter, the sending customer 102 can provide the ACH operator with a written instruction to increase or decrease the debit or credit payment cap.

After the ACH operator receives an ACH file originated using the XXXX identifier, the ACH operator can send a report of the aggregate running total dollar amount of all ACH debit and/or credit payments originated using the XXXX identifier during the specified time period, including amounts in the file or batch just originated, to each of the authorized representatives designated by the sending customer 102 for receiving such report via facsimile or e-mail. The report can be in the exemplary form of a file tracking and reporting table.

FIG. 5 illustrates a file tracking and reporting table 500 according to an exemplary embodiment of the present invention. The table 500 comprises the specified time period 502, which is a process date in the exemplary embodiment illustrated in the table 500. The table 500 also comprises sum totals of debit and credit payments 504, 506 included in each file 508, accumulated debit and credit payment values 510, 512 for the payments in the files 508, and the pre-established debit and credit payment caps 514, 516. The remaining debit and credit balances available 518, 520 indicate whether the respective accumulated payment values 510, 512 exceed the respective pre-established debit and credit payment caps 514, 516, respectively. If so, then the table 500 displays a warning message 522 to indicate that occurrence.

For each ACH file or batch comprising ACH payments that exceed the credit cap or the debit cap for a sending customer 102, the ACH operator 106 can contact the authorized representatives designated by the sending customer 102 for receiving notice of the breach of the debit cap or credit cap (each a "Notice Contact"), by telephone on a recorded line, by e-mail, or by other suitable means, and can inform the Notice Contact that the ACH operator 106 has received a file comprising ACH payments that exceed the applicable credit cap or debit cap. The sending customer 102 also can designate authorized representatives to decide on behalf of the sending customer 102 whether to instruct the ACH operator to override the credit or debit cap and to release a file or batch for processing or whether to reject a file or batch (each an "Approval Contact"). In an exemplary embodiment, the decision to release or reject can be made with respect to an entire file and not with respect to batches or payments within a file. In an alternative exemplary embodiment, the decision to release or reject also can be made with respect to batches within a file and with respect to payments within a batch.

The sending customer 102 can provide written instructions to the ACH operator defining default procedures in the event timely approval for rejection or processing is not received. If instructions to override a cap and to release a pended file for processing or to reject the pended file are not received from an Approval Contact by a specified deadline, the ACH operator can follow the written instruction provided by the sending customer 102.

The exemplary value tracking methods discussed above comprise rejecting the ACH payments when the accumulated payment value exceeds the payment cap. In an exemplary embodiment, a value tracking and reporting method can reject only a portion of the ACH payments which causes the accumulated payment value to exceed the payment cap, and the method can process the remaining payments. In that regard, the method can reject individual payments within a batch and can process the remaining payments within the batch. Alternatively, the method can reject one or more of a number of batches in a file and can process the remaining batches within the file.

The exemplary value tracking methods of the present invention can provide several advantages. Specifically, the system can reduce sending customer 102 involvement and can reduce processing time. For example, the sending customer 102 can authorize overriding a cap to process an ACH file or batch that will exceed a credit or debit cap without actually changing the credit or debit cap value. Accordingly, sending customer 102 involvement is reduced because the sending customer 102 does not actually have to change the affected cap, and the sending customer 102 does not have to reset the cap after processing of the cap-exceeding ACH payments. Additionally, processing of the ACH payments does not have to wait for the sending customer 102 to change the appropriate cap.

The "pre-processing" exemplary embodiment also can reduce processing delays. By pending incoming files prior to processing the ACH payments (i.e., at a preprocessing stage), processing delays can be avoided. The system can examine the pended files to determine if ACH payments contained therein will exceed a credit or debit cap. If the ACH payments will exceed a credit or debit cap, then the sending customer 102 is contacted for approval to override the cap prior to processing the cap-exceeding payments. In other words, the exemplary value tracking system will not begin ACH processing of a file or batch comprising cap-exceeding ACH payments. Accordingly, the system can avoid stopping and restarting of ACH settlement processing. Each file, batch, and item can be processed a single time.

In another exemplary embodiment, ACH files and batches can be examined during processing to determine if the ACH payments will exceed a credit or debit cap. If the ACH payments will exceed a credit or debit cap, then the ACH file or batch can be pended until override approval is obtained or until rejected by the sending customer 102. After receiving sending customer 102 approval to override a cap, the system can continue processing of the cap-exceeding file or batch. While not providing the pre-processing advantages discussed above, this exemplary embodiment still can reduce sending customer 102 involvement by not requiring an actual change in the credit or debit cap to process the cap-exceeding ACH payments.

The exemplary value tracking systems and methods can report ACH payment activity directly to the sending customer 102 without notifying the remote sending point 118. Accordingly, processing delays can be further reduced by directly seeking sending customer 102 approval to override a credit or debit cap. If the system reported cap-exceeding payments to the remote sending point 118, then the sending customer 102 would be unaware of attempts to exceed the cap. In the event the remote sending point 118 was unable to reduce its payments to accommodate the cap, the additional step of contacting the sending customer 102 to request a cap limit extension would be required. Thereafter, the sending customer 102 would have to contact the ACH operator 106 to authorize an override of the credit or debit cap. Finally, the remote sending point 118 must contact the ACH operator 106 with instructions to resubmit the cap-exceeding ACH payments for processing. Those additional notification/authorization steps can delay processing of the cap-exceeding ACH payments.

A debit cap is significantly different from a credit cap. Additionally, a debit cap is contrary to conventional wisdom for monitoring ACH payments. The conventional wisdom for monitoring ACH payments involves controlling ACH credits for which the sending customer 102 is responsible. The sending customer 102 will make payments out of its accounts as payment to the respective receiver of each ACH credit. Accordingly, the sending customer 102 desires to monitor and control the amount of outgoing payments necessary to cover the ACH credits.

On the other hand, an ACH debit payment involves ACH debits issued to a receiver on behalf of the sending customer 102. The receiver will make payment out of its accounts to the sending customer 102 for the ACH debits. Debit payments provide incoming money to the sending customer 102. Accordingly, limiting the amount of incoming money received from ACH debit payments is contrary to the conventional wisdom of protecting outgoing money transactions.

However, a sending customer 102 may desire to limit ACH debit payments in anticipation of a receiver returning those payments. For example, a sending customer 102 originator can sell goods over the Internet to buyers. To receive payment, the sending customer 102 originator or seller issues ACH debit payments to the buyers' bank accounts at receiving banks. The receiving banks are charged/debited for the ACH debit and the sending customer 102 is credited. Then, the sending customer 102 credits the seller's account. If the buyer places a stop payment on the transaction, the receiving bank returns the ACH debit payment to the sending customer 102. The sending customer 102 will then attempt to retrieve the money from the seller's account as required by the return from the receiving bank. If the seller has closed the account or has withdrawn the money, then the sending customer 102 alone is responsible for the returned ACH debit. As a result, sending customers 102 may desire to cap ACH debits originated by remote sending points to limit their exposure to returned ACH debit payments.

Figure 6:
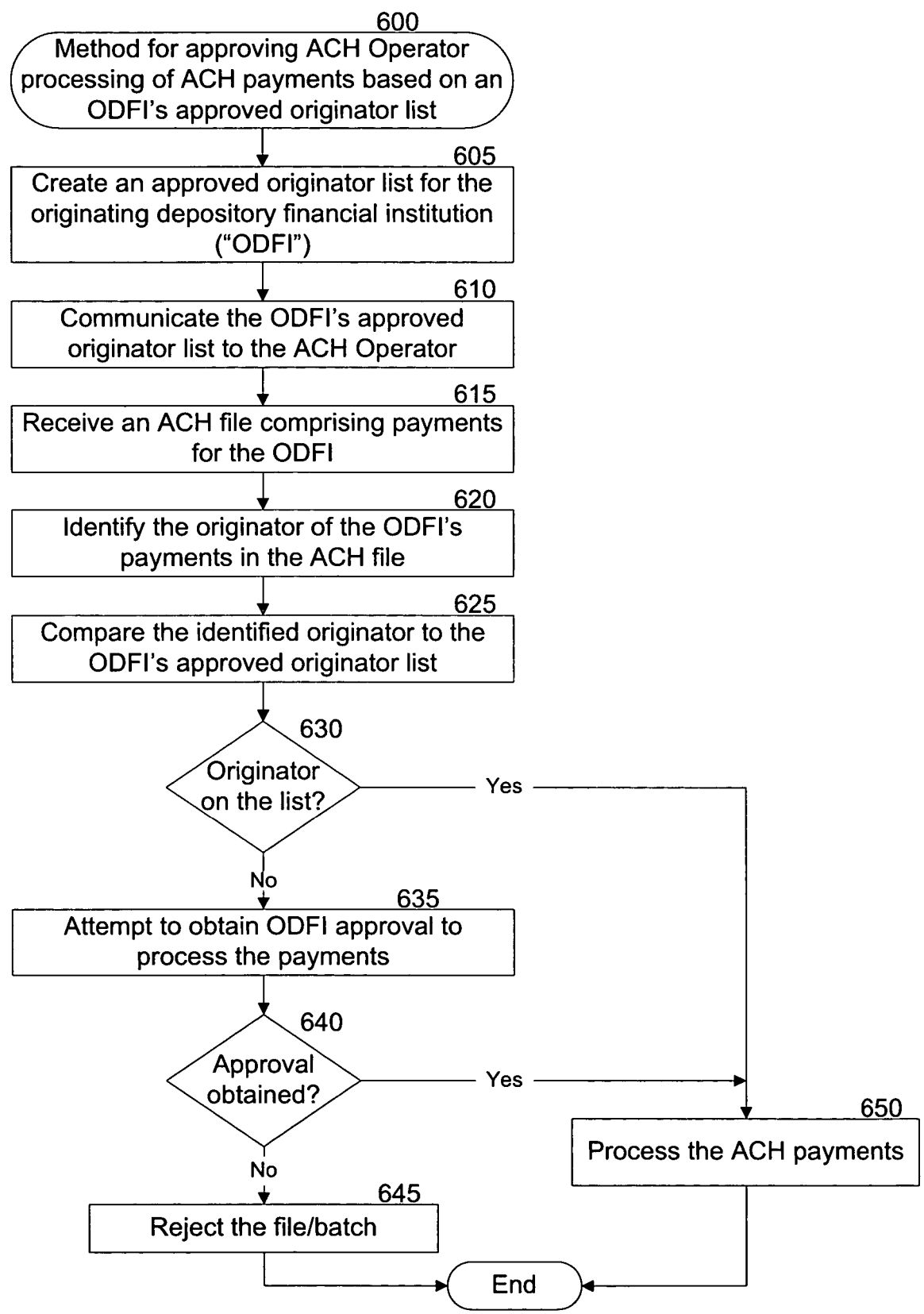
FIG. 6 is a flowchart depicting a method for approving ACH operator processing of ACH payments based on an approved originator list according to an exemplary embodiment of the present invention.

FIG. 6 is a flowchart depicting a method 600 for approving ACH operator processing of ACH payments based on an approved originator list according to an exemplary embodiment of the present invention. The method 600 will be described with reference to FIGS. 1 and 6. In step 605, an ODFI, such as the sending customer 102, creates an approved originator list identifying originators authorized by the ODFI to originate ACH payments and to send those ACH payments to the ACH operator 106 on behalf of the ODFI. Each authorized originator can comprise a remote sending point 118. In an exemplary embodiment, each authorized originator can be a remote originator for the ODFI. In that case, each authorized originator is an account holder of the ODFI.

In an exemplary embodiment, the ODFI can create the approved originator list by compiling a list of originators that the ODFI has authorized to originate ACH payments and to send those ACH payments to the ACH operator 106 on behalf of the ODFI. The ODFI can create an electronic list of information that identifies the approved originators. For example, the list of information can comprise an identifier for each approved originator. The identifier can comprise a unique identification number for each respective approved originator, a name of the approved originator, or any other suitable identification of the approved originator.

In step 610, the ODFI communicates its approved originator list to the processing module 110 of the ACH operator 106 via the network 108, and the processing module 110 stores the ODFI's approved originator list in the database 113.

In step 615, the processing module 110 of the ACH operator 106 receives an ACH file comprising originated ACH payments sent to the ACH operator 106 on behalf of the ODFI for ACH processing and settlement. Then, in step 620, the ACH operator 106 identifies the originator of the ODFI's payments in the ACH file. In an exemplary embodiment, if the ACH file comprises one or more batches that each comprise ACH payments for the ODFI, then the processing module 110 of the ACH operator 106 can identify the originator of the ODFI's payments by reading information identifying the originator from a header of the ACH file. In another exemplary embodiment, if the ACH file comprises batches that each comprise ACH payments for a different ODFI, then the processing module 110 of the ACH operator 106 can identify the originator of a specific ODFI's payments by reading information identifying the originator from a header of the ACH batch comprising ACH payments for the specific ODFI. In yet another exemplary embodiment, the ACH operator 106 can identify the originator of the ODFI's payments by reading information identifying the originator from the item record for each ACH payment.

In step 625, the processing module 110 of the ACH operator 106 compares the identified originator to the ODFI's approved originator list stored in the database 113 to determine whether the identified originator is on the ODFI's approved originator list, step 630. In an exemplary embodiment, the processing module 110 can compare the header information identifying the originator to the information provided on the ODFI's approved originator list to determine if a match exists. If a match exists, then the processing module 110 determines in step 630 that the identified originator is on the ODFI's approved originator list.

If the identified originator is on the ODFI's approved originator list, then the method 600 branches from step 630 to step 650 in which the processing module 110 processes the ACH payments. The processing module 110 can perform any suitable processing of the ACH payments after determining that the originator is on the ODFI's approved originator list. For example, according to exemplary embodiments, the processing module 110 can process the ACH payments as previously described in the method 200 illustrated in FIG. 2 and/or as previously described with reference to step 240 illustrated in FIG. 2. If the identified originator is not on the ODFI's approved originator list, then the method 600 branches from step 630 to step 635.

In step 635, the processing module 110 pends the ACH payments, and the ACH operator 106 attempts to obtain approval from the ODFI to process the payments originated by the identified originator that is not on the ODFI's approved originator list. In an exemplary embodiment, the ACH operator 106 can contact the ODFI and seek approval to process the ACH payments. The ACH operator 106 can contact the ODFI via telephone, electronic mail correspondence, or any other suitable means. In another exemplary embodiment, step 635 can encompass a process similar to the step 225 discussed previously herein with respect to FIG. 4.

In step 640, the method 600 determines whether the ODFI approved processing of the ACH payments originated by the identified originator that is not on the ODFI's approved originator list. If yes, then the method 600 branches to step 650 in which the processing module 110 processes the ACH payments, as previously discussed. If not, then the method 600 branches to step 645 in which the processing module 110 rejects or pends the ACH payments originated by the identified originator that is not on the ODFI's approved originator list.

The method 600 can protect the ODFI from unauthorized payments originated by an unauthorized originator and sent to the ACH operator 106 on behalf of the ODFI. Additionally, the method 600 can allow the ODFI to control the originators that can send ACH payments to the ACH operator on behalf of the ODFI. For example, if a party originates ACH payments and fraudulently sends those ACH payments to the ACH operator 106 on behalf of the ODFI, then those payments will be pended or rejected because the originator is not on the ODFI's approved originator list. The ODFI also can control previously legitimate originators. The ODFI can remove an originator from its approved originator list to prevent that originator from originating future payments and sending those payments to the ACH operator 106 on behalf of the ODFI. Thus, the ODFI can control an originator that the ODFI no longer trusts to send payments directly to the ACH operator.

The present invention can be used with computer hardware and software that performs the methods and processing functions described above. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the present invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the present invention defined in the following claims, the scope of which is to be accorded the broadest interpretation so as to encompass such modifications and equivalent structures.

What is claimed is:

1. A computer-implemented method for approving automated clearing house ("ACH") payments for processing by an ACH operator, comprising the steps of:
   receiving, by the ACH operator, an approved originator list from an originating depository financial institution ("ODFI"), the list comprising at least one originator authorized by the ODFI to originate and send ACH payments to the ACH operator on behalf of the ODFI;
   receiving, by the ACH operator, an ACH file for ACH processing, the ACH file comprising at least one ACH payment originated by a first originator and sent to the ACH operator on behalf of the ODFI;
   identifying, by a processing module of the ACH operator, the first originator based on information within the ACH file and determining whether the identified first originator is on the approved originator list; and
   protecting the ODFI from unauthorized payments originated by unauthorized originators by
       processing, by the ACH operator, the at least one ACH payment in response to determining that the identified first originator is on the approved originator list; and
       rejecting, by the ACH operator, the at least one ACH payment in response to determining that the identified first originator is not on the approved originator list,
   wherein the processing module is implemented in a computer system that comprises instructions stored in a machine-readable medium and a processor that executes the instructions.

2. The method according to claim 1, further comprising the step of determining whether to process the at least one ACH payment in response to the determination that the identified first originator is not on the approved originator list.

3. The method according to claim 1, further comprising the steps of:
   in response to determining that the identified first originator is not on the approved originator list, requesting approval from the ODFI to process the at least one ACH payment; and
   when receiving approval from the ODFI to process the at least one ACH payment, processing the at least one ACH payment by the ACH operator in response to receiving the approval.

4. The method according to claim 1, further comprising the steps of:
   in response to determining that the identified first originator is not on the approved originator list, requesting approval from the ODFI to process the at least one ACH payment; and
   when receiving a denial of approval from the ODFI to process the at least one ACH payment, rejecting the at least one ACH payment in response to receiving the denial of approval.

5. The method according to claim 1, further comprising the step of creating the approved originator list prior to receiving the approved originator list.

6. The method according to claim 1, wherein the step of identifying the first originator comprises reading an identifier of the first originator that is associated with the at least one ACH payment.

7. The method according to claim 6, wherein the reading step comprises reading the identifier from one of a file header record, a batch header record, and an item detail record associated with the at least one ACH payment.

8. The method according to claim 1, wherein the ACH file comprises an ACH batch that comprises the at least one ACH payment.

9. A computer-readable medium having stored therein a set of computer-executable instructions that when executed cause a computer to perform a process for approving automated clearing house ("ACH") payments for processing by an ACH operator, the process comprising the steps of:
   receiving an approved originator list from an originating depository financial institution ("ODFI"), the list comprising at least one originator authorized by the ODFI to originate and send ACH payments to the ACH operator on behalf of the ODFI;
   receiving an ACH file at the ACH operator for ACH processing, the ACH file comprising at least one ACH payment originated by a first originator and sent to the ACH operator on behalf of the ODFI;
   identifying, by the computer, the first originator based on information within the ACH file and determining whether the identified first originator is on the approved originator list; and
   protecting the ODFI from unauthorized payments originated by unauthorized originators by processing the at least one ACH payment in response to determining that the identified first originator is on the approved originator list, and rejecting the at least one ACH payment in response to determining that the identified first originator is not on the approved originator list.

10. A computer-implemented method for approving automated clearing house ("ACH") payments for processing by an ACH operator, comprising the steps of:
    receiving, by an ACH operator, at least one ACH payment for ACH processing, the at least one ACH payment being originated by a first originator and sent to the ACH operator on behalf of an originating depository financial institution ("ODFI");
    identifying, by a processing module of the ACH operator, the first originator based on information associated with the at least one ACH payment and determining whether the identified first originator is on an approved originator list that identifies at least one originator authorized by the ODFI to originate and send ACH payments to the ACH operator on behalf of the ODFI; and
    protecting the ODFI from unauthorized payments originated by unauthorized originators by processing, by the ACH operator, the at least one ACH payment in response to determining that the identified first originator is on the approved originator list, and rejecting, by the ACH operator, the at least one ACH payment in response to determining that the identified first originator is not on the approved originator list,
    wherein the processing module is implemented in a computer system that comprises instructions stored in a machine-readable medium and a processor that executes the instructions.

11. The method according to claim 10, further comprising the step of determining whether to process the at least one ACH payment in response to the determination that the identified first originator is not on the approved originator list.

12. The method according to claim 10, further comprising the steps of:
    in response to determining that the identified first originator is not on the approved originator list, requesting approval from the ODFI to process the at least one ACH payment; and
    when receiving approval from the ODFI to process the at least one ACH payment, processing the at least one ACH payment by the ACH operator in response to receiving the approval.

13. The method according to claim 10, further comprising the steps of:
    in response to determining that the identified first originator is not on the approved originator list, requesting approval from the ODFI to process the at least one ACH payment; and
    when receiving a denial of approval from the ODFI to process the at least one ACH payment, rejecting the at least one ACH payment in response to receiving the denial of approval.

14. The method according to claim 10, further comprising the step of creating the approved originator list prior to determining whether the identified first originator is on the approved originator list.

15. The method according to claim 10, further comprising the step of receiving the approved originator list by the ACH operator prior to determining whether the first originator is on the approved originator list.

16. The method according to claim 10, wherein the step of identifying the first originator comprises reading an identifier of the first originator that is associated with the at least one ACH payment.

17. The method according to claim 16, wherein the reading step comprises reading the identifier from one of a file header record, a batch header record, and an item detail record with which the at least one ACH payment is associated.

18. The method according to claim 10, wherein the first originator sends the ACH payment to the ACH operator via an ACH batch that is provided in an ACH file.

19. A computer-readable medium having stored therein a set of computer-executable instructions that when executed cause a computer to perform a process for approving automated clearing house ("ACH") payments for processing by an ACH operator, the process comprising the steps of:
    receiving at least one ACH payment at the ACH operator for ACH processing, the at least one ACH payment being originated by a first originator and sent to the ACH operator on behalf of an originating depository financial institution ("ODFI");
    identifying, by the computer, the first originator based on information associated with the at least one ACH payment and determining whether the identified first originator is on an approved originator list that identifies at least one originator authorized by the ODFI to originate and send ACH payments to the ACH operator on behalf of the ODFI; and
    protecting the ODFI from unauthorized payments originated by unauthorized originators by processing the at least one ACH payment by the ACH operator in response to determining that the identified first originator is on the approved originator list, and rejecting the at least one ACH payment in response to determining that the identified first originator is not on the approved originator list.

20. A computer-implemented method for processing automated clearing house ("ACH") payments by an ACH operator, comprising the steps of:
    receiving, by the ACH operator, at least one ACH payment for ACH processing, the at least one ACH payment being originated by a first originator and sent to the ACH operator on behalf of an originating depository financial institution ("ODFI");

identifying, by a processing module of the ACH operator, the first originator based on information associated with the at least one ACH payment and determining whether the ODFI approved ACH payment processing for payments received from the identified first originator on behalf of the ODFI; and protecting the ODFI from unauthorized payments originated by unauthorized originators by processing, by the ACH operator, the at least one ACH payment in response to a determination that the ODFI approved ACH payment processing for payments received from the identified first originator on behalf of the ODFI, and rejecting, by the ACH operator, the at least one ACH payment in response to a determination that the ODFI did not approve ACH payment processing for payments received from the identified first originator on behalf of the ODFI, wherein the processing module is implemented in a computer system that comprises instructions stored in a machine-readable medium and a processor that executes the instructions.

21. The method according to claim 20, further comprising the step of receiving an approved originator list from the ODFI that identifies at least one originator authorized by the ODFI to originate and send ACH payments to the ACH operator on behalf of the ODFI, wherein determining whether the ODFI approved ACH payment processing for payments received from the first originator on behalf of the ODFI comprises determining whether the identified first originator is on the approved originator list.

22. The method according to claim 21, further comprising the step of rejecting the at least one ACH payment in response to determining that the identified first originator is not on the approved originator list.

23. The method according to claim 21, further comprising the step of determining whether to process the at least one ACH payment in response to determining that the identified first originator is not on the approved originator list.

24. The method according to claim 23, wherein the step of determining whether to process the at least one ACH payment comprises the steps of:

in response to determining that the identified first originator is not on the approved originator list, requesting approval from the ODFI to process the at least one ACH payment; and when receiving approval from the ODFI to process the at least one ACH payment, processing the at least one ACH payment by the ACH operator in response to receiving the approval.

25. The method according to claim 23, wherein the step of determining whether to process the at least one ACH payment comprises the steps of:

in response to determining that the identified first originator is not on the approved originator list, requesting approval from the ODFI to process the at least one ACH payment; and when receiving a denial of approval from the ODFI to process the at least one ACH payment, rejecting the at least one ACH payment in response to receiving the denial of approval.

26. The method according to claim 21, wherein the processing step is performed in response to determining that the identified first originator is on the approved originator list.

27. The method according to claim 20, wherein the step of identifying the first originator comprises reading an identifier of the first originator that is associated with the at least one ACH payment.

28. The method according to claim 20, wherein the reading step comprises reading the identifier from one of a file header record, a batch header record, and an item detail record associated with the at least one ACH payment.

29. A computer-readable medium having stored therein a set of computer-executable instructions that when executed cause a computer to perform a process for processing automated clearing house ("ACH") payments by an ACH operator, the process comprising the steps of:

receiving at least one ACH payment at the ACH operator for ACH processing, the at least one ACH payment being originated by a first originator and sent to the ACH operator on behalf of an originating depository financial institution ("ODFI"); identifying, by the computer, the first originator based on information associated with the at least one ACH payment and determining whether the ODFI approved ACH payment processing for payments received from the identified first originator on behalf of the ODFI; and protecting the ODFI from unauthorized payments originated by unauthorized originators by processing the at least one ACH payment in response to a determination that the ODFI approved ACH payment processing for payments received from the identified first originator on behalf of the ODFI, and rejecting the at least one ACH payment in response to a determination that the ODFI did not approve ACH payment processing for payments received from the identified first originator on behalf of the ODFI.

30. A computer-implemented method for approving automated clearing house ("ACH") payments for processing by an ACH operator, comprising the steps of:

receiving, by a computer, at least one ACH payment for ACH processing by the ACH operator, the at least one ACH payment being originated by a first originator and sent to the ACH operator on behalf of an originating depository financial institution ("ODFI");

identifying, by the computer, the first originator that originated the at least one ACH payment based on information associated with the at least one ACH payment;

determining, by the computer, whether the identified first originator is on an approved originator list that identifies at least one originator authorized by the ODFI to originate and send ACH payments to the ACH operator on behalf of the ODFI; and protecting the ODFI from unauthorized payments originated by unauthorized originators by processing, by the computer, the at least one ACH payment by the ACH operator in response to determining that the identified first originator is on the approved originator list, and rejecting, by the computer, the at least one ACH payment in response to determining that the identified first originator is not on the approved originator list.

31. The method according to claim 30, further comprising the step of determining, by the computer, whether to process the at least one ACH payment in response to determining that the first originator is not on the approved originator list.

32. The method according to claim 30, further comprising the step of receiving, by the computer, the approved originator list at the ACH operator prior to determining whether the first originator is on the approved originator list.

* * * * *